United States Patent [19]
Thrush

[11] 3,966,263
[45] June 29, 1976

[54] BLEND BACK PROPORTIONING VALVE FOR BRAKE SYSTEM

[75] Inventor: Richard G. Thrush, North Olmsted, Ohio

[73] Assignee: The Weatherhead Company, Cleveland, Ohio

[22] Filed: Aug. 25, 1975

[21] Appl. No.: 607,476

[52] U.S. Cl. ............................... 303/6 C; 137/494; 188/349
[51] Int. Cl.² ......................................... B60T 8/26
[58] Field of Search ................ 303/6 C, 6 R, 84, 22, 303/87; 188/349, 152; 137/102, 494

[56] References Cited
UNITED STATES PATENTS

| | | | |
|---|---|---|---|
| 3,011,833 | 12/1961 | Stelzer | 303/22 R X |
| 3,228,731 | 1/1966 | Valentine | 303/22 R X |
| 3,453,029 | 7/1969 | Swanson | 303/6 C |
| 3,769,997 | 11/1973 | Hardwick et al. | 303/6 C X |

*Primary Examiner*—Trygve M. Blix
*Assistant Examiner*—Douglas C. Butler
*Attorney, Agent, or Firm*—McNenny, Pearne, Gordon, Gail, Dickinson & Schiller

[57] ABSTRACT

A motor vehicle air brake system which includes a blend back proportioning valve which reduces brake sensitivity at low braking pressures and which allows full braking at high braking pressures. The proportioning valve includes a shuttle piston, a blend back sleeve, and a one-piece outlet diaphragm. The outlet diaphragm seals a reference chamber from outlet pressure and permits movement of the shuttle piston and blend back sleeve together as well as movement of the shuttle piston and blend back sleeve relative to one another. The proportioning valve also includes a one-piece inlet diaphragm which seals the reference chamber from inlet pressure and which provides a valving surface to open and close communication between the inlet and the outlet of the valve. In a second and third embodiment of the proportioning valve, springs are added to alter the proportioning characteristics of the valve.

14 Claims, 7 Drawing Figures

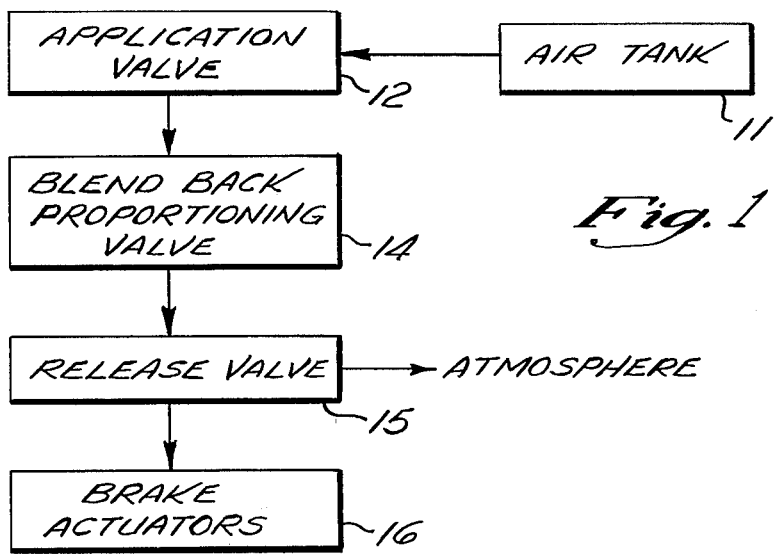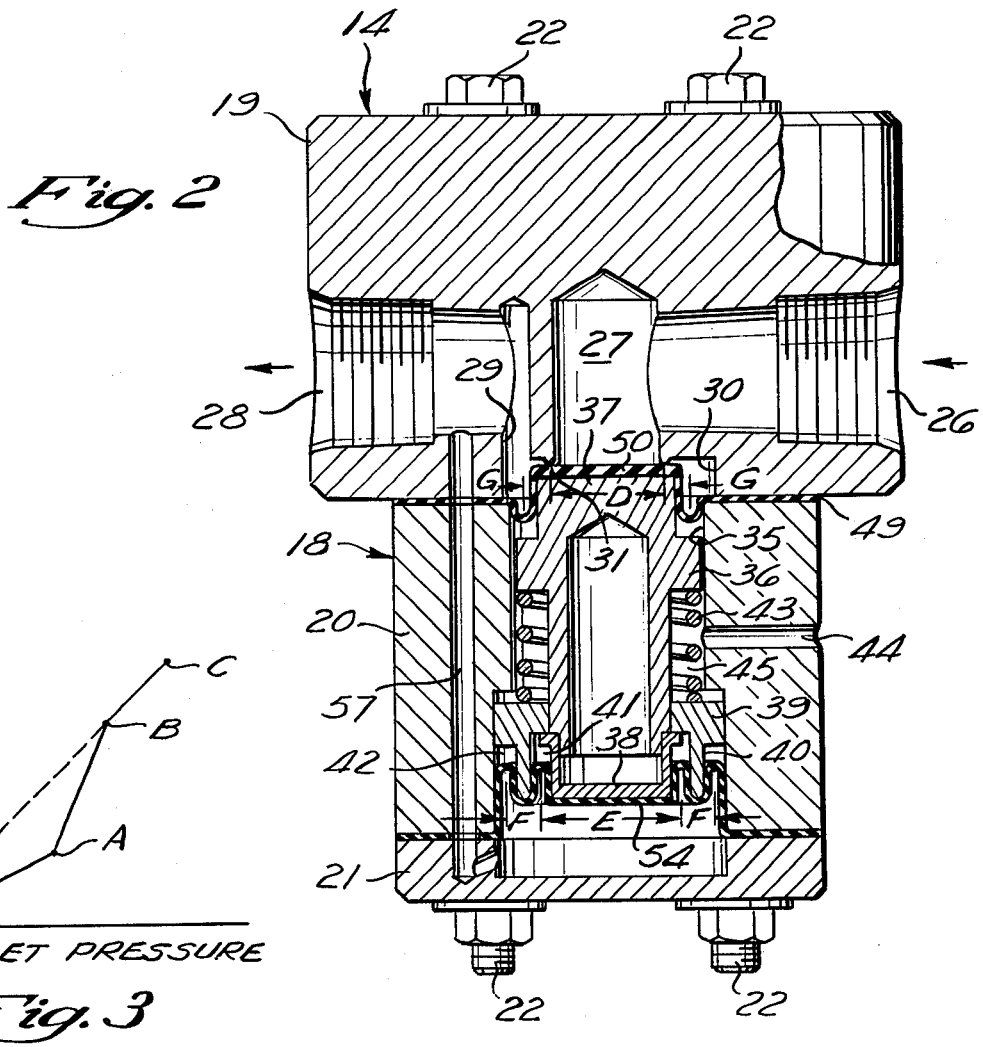

BLEND BACK PROPORTIONING VALVE FOR BRAKE SYSTEM

BACKGROUND AND SUMMARY OF THE INVENTION

Modern motor vehicle air brake systems, and particularly such systems as are now used on large trucks, provide greater braking capacity than systems provided in the past. Although this increased capacity provides better braking characteristics for heavily loaded vehicles, this increased capacity also increases the sensitivity of the brakes during stopping of a lightly loaded vehicle. This makes it more difficult for the operator to execute a smooth stop, particularly at low speeds, with a lightly loaded vehicle and makes the front wheel brakes more sensitive at low system pressures.

Brake systems which include air brake blend back proportioning valves to overcome this problem (that is, valves which provided an outlet pressure proportionally reduced from the inlet pressure at lower braking pressures and which blend back or equalize inlet and outlet pressures at higher braking pressures) are shown in U.S. Pat. Nos. 3,453,029 and 3,769,997 and in pending U.S. patent application Ser. No. 475,059, filed May 31, 1974.

The present invention departs from prior art air brake systems by providing an air brake system in which the proportioning valve includes a shuttle piston, a blend back sleeve, and a one-piece outlet diaphragm. The outlet diaphragm seals a reference chamber from outlet pressure and permits movement of the shuttle piston and blend back sleeve together as well as movement of the shuttle piston and blend back sleeve relative to one another. The proportioning valve also includes a one-piece inlet diaphragm which seals the reference chamber from inlet pressure and which provides a valving surface to open and close communication between the inlet and the outlet of the valve.

BRIEF DESCRIPTION OF THE DRAWINGS

These and other aspects and advantages of the invention are incorporated in the three embodiments of the invention shown in the drawings, wherein:

FIG. 1 is a schematic view of a motor vehicle air brake system incorporating a blend back proportioning valve according to this invention.

FIG. 2 is a lateral cross-sectional view of a first embodiment of a blend back proportioning valve which may be utilized in the system shown in FIG. 1;

FIG. 3 is a graphical representation of the relationship between inlet and outlet pressures for the blend back proportioning valve shown in FIG. 2;

DETAILED DESCRIPTION OF THE DRAWINGS

Figure 4:
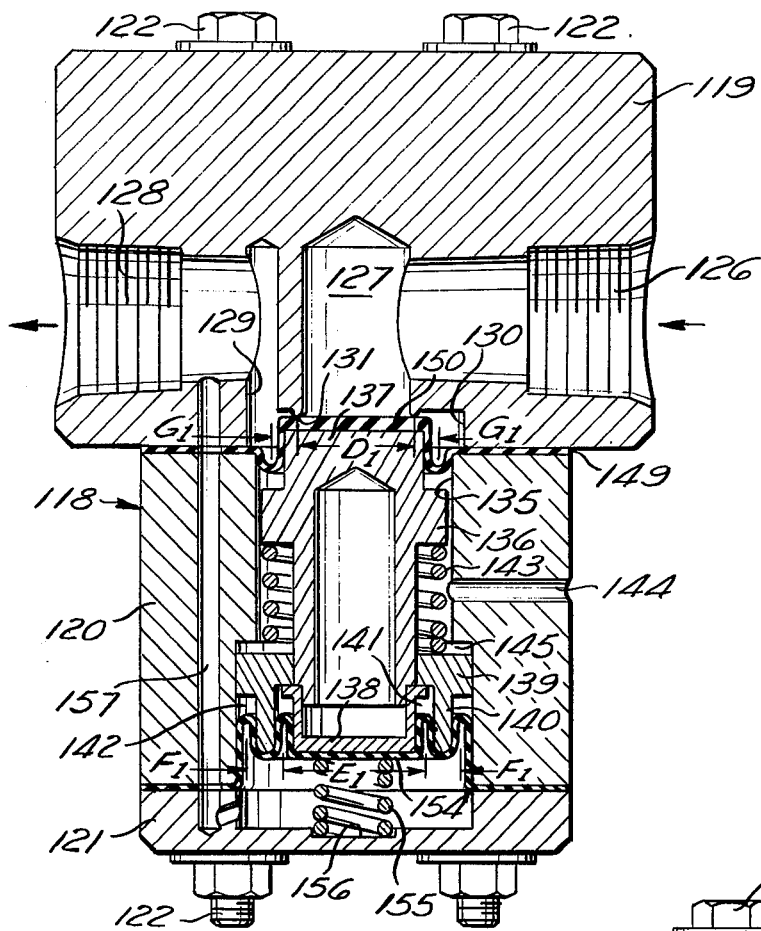
FIG. 4 is a lateral cross-sectional view of a second embodiment of a blend back proportioning valve which may be utilized in the system shown in FIG. 1.

Referring now to the drawings in greater detail, FIG. 1 shows a motor vehicle air brake system which is particularly adapted for use on large trucks. The system includes a conventional air tank 11 which provides a source of high pressure air and which is pressurized by a pump (not shown in the drawings). The air tank 11 is connected to a conventional application valve 12 which is actuatable by the operator of the vehicle to apply or release the brakes of the vehicle.

The application valve 12 supplies air from the tank 11 to a blend back proportioning valve 14 which is described in detail below with reference to FIGS. 2 through 7. Air from the outlet of the blend back proportioning valve 14 is then supplied to a conventional release valve 15 and then to conventional brake actuators 16. The release valve 15, in a well-known manner, provides a flow path to the brake actuators 16 when air is being supplied to actuate the brakes of the vehicle, and provides a flow path from the brake actuators 16 to the atmosphere when the air pressure supplied to the release valve 15 is decreased so that the air pressure in the brake actuators 16 is also decreased. The air tank 11, application valve 12, release valve 15, and brake actuators 16 are all conventional and are well-known in the art.

Referring now to FIG. 2, the structural details of a first embodiment of the blend back proportioning valve 14 are shown. The proportioning valve 14 includes a multiple piece housing 18 which includes a cylindrical port plate 19, a cylindrical main body 20, and a cylindrical outlet end cap 21. The port plate 19 and main body 20 and end cap 21 are secured together by a plurality of circumferentially spaced assembly bolts 22, two of which are shown in FIG. 2.

The cylindrical port plate 19 includes an inlet port 26 which extends radially inwardly to an axially extending inlet passage 27. An outlet port 28 extends radially inwardly from the other side of the cylindrical port plate 19 to an axially extending outlet passage 29. A machined counterbore 30 provides a flow path between the inlet passage 27 and outlet passage 29, and an annular valve seat 31 at the juncture of the inlet passage 27 and counterbore 30 is provided to open and close fluid pressure communication between the passages 27 and 29.

The main body 20 includes a bore 35 extending from end to end therethrough. A shuttle piston 36 is slidably disposed in the bore 35 and includes an inlet end 37 and an outlet end 38. The ends 37 and 38 are press fit together to prevent relative movement therebetween during operation of the proportioning valve. A blend back sleeve 39 is slidable disposed on the exterior of the shuttle piston 36 for movement relative to the shuttle piston 36 and relative to the bore 35 as explained below. The blend back sleeve 39 includes an axially extending cylindrical skirt portion 40 which is spaced radially inwardly from the bore 35 and radially outwardly from the shuttle piston 36. The skirt portion 40 and shuttle piston 36 cooperatively define a radially inner annular diaphragm cavity 41, and the skirt portion 40 and bore 35 cooperatively define a radially outer annular diaphragm cavity 42 which is concentric with the cavity 41. A preloaded compression spring 43 acts between the sleeve 39 and the shuttle piston 36 to prevent relative movement therebetween during low pressure operation of the valve and to permit the sleeve 39 to move relative to the shuttle piston 36 when a predetermined pressure level is reached as described in detail below. A vent passage 44 extends radially through the main body 20 to vent a sealed reference pressure chamber 45 in the bore 35 to atmospheric pressure under all conditions.

A one-piece elastomeric inlet diaphragm 49 is provided on the inlet end of the shuttle piston 36. An annular radially outer peripheral portion of the inlet diaphragm 49 is secured to the housing 18 by being clamped between the port plate 19 and the main body 20. A radially inner center portion 50 of the diaphragm 49 is secured to the inlet end of the shuttle piston 36 by the pressure differential between the inlet passage 27 and the reference chamber 45. The center portion 50 of the inlet diaphragm 49 is of substantially greater wall thickness than the remaining portions of the diaphragm 49. In the embodiment shown in FIG. 2, the wall thickness of the center portion 50 is approximately two times the wall thickness of the remaining portions of the diaphragm 49 and is of sufficient magnitude that the center portion 50 provides a valving surface which cooperates with the valve seat 31 to open and close fluid pressure communication between the inlet port 26 and outlet port 28. The inlet diaphragm 49 is molded in the configuration shown in FIG. 2, and the annular U-shaped portion of the diaphragm 49 between the increased thickness center portion 50 and the radially outer peripheral portion of the diaphragm 49 rolls as the shuttle piston 36 moves in the bore 35.

An outlet diaphragm 54 is provided adjacent the outlet end 38 of the shuttle piston 36. An annular radially outer peripheral portion of the outlet diaphragm 54 is sealingly secured to the housing 18 by being clamped between the main body 20 and the outlet end cap 21, and a radially inner center portion of the diaphragm 54 is retained against the outlet end 38 of the shuttle piston 36 by a pressure differential between the pressure in the outlet port 28 and the pressure in the reference chamber 45. The outlet diaphragm 54 also includes a first U-shaped portion disposed in the outer diaphragm cavity 42 and a second U-shaped portion disposed in the inner diaphragm cavity 41. The outer U-shaped portion in the outer cavity 42 rolls as the shuttle piston 36 and sleeve 39 move axially together in the bore 35. Both of the U-shaped portions of the outlet diaphragm 54 roll in their respective cavities when the sleeve 39 moves axially in the bore 35 relative to the shuttle piston 36. A passage 57 extends through the port plate 19 and main body 20 and end plate 21 to maintain one side of the outlet diaphragm 54 in open fluid pressure communication with the pressure in the outlet port 28 under all conditions. The outlet diaphragm 54 is molded in the configuration shown in FIG. 2.

Referring now to the operation of the system shown in FIG. 1 with the first embodiment of the blend back porportioning valve shown in FIG. 2 utilized therein, the components of the proportioning valve 14 are held in the positions shown in FIG. 2 by the elastic memory of the inlet diaphragm 49 and outlet diaphragm 54 when the brakes of the vehicle are deactuated. With the proportioning valve 14 in this position, the increased thickness center portion 50 of the inlet diaphragm 49 lightly engages the valve seat 31.

When the air pressure in the inlet port 26 begins to increase as a result of the operator of the motor vehicle actuating the application valve 12 to supply air under pressure to the inlet port 26, the shuttle piston 36 initially moves downwardly and then shuttles toward and away from the valve seat 31 to provide increases in outlet pressure which are proportional to but less than increases in inlet pressure. This is because the shuttle piston 36 acts as a differential diameter pressure reducing piston. The force urging the shuttle piston 36 downwardly as viewed in FIG. 2 is equal to the inlet port pressure multiplied times the lateral cross-sectional area D of the center portion 50 of the inlet diaphragm 49 which is exposed to inlet port pressure. The force urging the shuttle piston 36 upwardly as viewed in FIG. 2 is equal to the outlet port pressure multiplied times the net effective lateral cross-sectional area of the shuttle piston 36 exposed to outlet port pressure. This net area exposed to outlet port pressure is equal to the lateral cross-sectional area E of the outlet diaphragm 54 which acts against the outlet end 38 plus the annular lateral cross-sectional area F of the outlet diaphragm 54 which acts against the skirt portion 40 of the sleeve 39 minus the annular lateral cross-sectional area G of the inlet diaphragm 49 which acts against the inlet end 37. This net area of the shuttle piston 36 exposed to outlet port pressure is greater than the net area exposed to inlet port pressure. In order to balance the forces acting on these differential areas of the shuttle piston 36, the center portion 50 of the inlet diaphragm 49 and valve seat 31 throttle air flow thereacross in order to provide increases in outlet pressure which are less than increases in inlet pressure.

The sleeve 39 does not move relative to the shuttle piston 36 during this portion of the operation of the valve. This is because the preload of the spring 43 retains the sleeeve 39 in the position shown in FIG. 2 until the force of the outlet port pressure acting against the annular area F of the outlet diaphragm 54 is sufficient to overcome the preload of the spring 43.

This portion of the operation of the proportioning valve shown in FIG. 2 is shown by the line OA in FIG. 3. Line OA shows that, as the pressure in the inlet port 26 increases, the pressure in the outlet port 27 increases by a proportional but smaller amount to balance the forces on the shuttle piston 36. In this manner, during low braking pressures such as occur during low speed stops of a lightly loaded vehicle, the outlet pressure supplied to the brake actuators 16 is reduced to decrease the sensitivity of the brakes.

When the inlet and outlet pressure indicated at point A are reached, the force created on the sleeve 39 by the outlet pressure acting against the annular area F of the outlet diaphragm 54 is sufficient to overcome the preload of the spring 43. When this occurs, the sleeve 39 begins to move upwardly as viewed in FIG. 2 relative to the shuttle piston 36. As the sleeve 39 moves relative to the shuttle piston 36, the U-shaped portion of the diaphragm 54 in the outer annular diaphragm chamber 42 and the annular U-shaped portion of the diaphragm 54 in the inner diaphragm chamber 41 roll to maintain the outlet diaphragm 54 against the skirt portion 40 of the sleeve 39. The sleeve 39 continues this upward movement until it engages the annular abutment in the bore 35, after which any further increases in the outlet pressure acting against the annular area F act against the main body 20 rather than against the shuttle piston 36. Thus, the lateral cross-sectional area of the outlet diaphragm 54 exposed to further increases in outlet port pressure and acting against the shuttle piston 36 is decreased by the amount of the annular area F when the pressure indicated at point A are reached.

As the pressure in the inlet port 26 continues to increase above point A, the shuttle piston 36 acts as a differential diameter pressure intensifying piston to maintain increases in outlet pressure greater than increases in inlet pressure to continue to balance the forces on the shuttle piston 36. This is because the shuttle piston 36 can be considered separate from the annular sleeve 39 as soon as the annular sleeve 39 begins to move upward relative to the shuttle piston 36, and area D of the center portion 50 of the inlet diaphragm 49 exposed to inlet pressure acting in a downward direction to open the valve is greater than the net area E minus G of the shuttle piston 36 exposed to outlet pressure acting in an upward direction to close the valve. In order to balance the forces acting on these differential areas of the shuttle piston 36, the center portion 50 and valve seat 31 act to provide increases in outlet pressure which are greater than increases in inlet pressure.

This portion of the operation of the valve is shown by line AB in FIG. 3 and continues until the inlet and outlet pressure indicated at point B are reached. At point B, the inlet port pressure is equal to the outlet port pressure. When the inlet port pressure increases above the pressure indicated at point B, the inlet and outlet pressure move the shuttle piston 36 downwardly as viewed in FIG. 2 to separate the center portion 50 of the inlet diaphragm 49 from the valve seat 31. The shuttle piston 36 can no longer act as a pressure intensifying piston, since the equal pressures acting on the area D and G of the inlet diaphragm 49 and on the area E of the outlet diaphragm 54 then maintain the shuttle piston 36 in a lower position away from the valve seat 31 to permit unrestricted application of air pressure through the proportioning valve 14 at pressures above point B.

Although the operation of the blend back proportioning valve shown in FIG. 2 has been described and illustrated in FIG. 3 as occuring along straight lines with sharp corners at A and B, in actual practice the slight friction of the seals and the spring rate of the spring 43 (that is, the dynamic characteristics of the proportioning valve), provide a gradual rather than instantaneous transition from the slope of line OA to the slope of line AB and from the slope of line AB to the slope of line BC during actual operation of the valve.

When point C is reached and the operator of the vehicle desires to release the brakes, the application valve is deactuated to decrease the supply of air to the proportioning valve 14. This decreases the pressure provided to the release valve 15 (a one-way normally closed ball type check valve, not shown, may be provided in a conduit directly connecting the application valve 12 and the release valve 15 around the proportioning valve 14 to permit reverse flow of air from the release valve 15 to the application valve 12 if desired). The release valve 15 then vents the brake actuators 16 to atmosphere in a well-known manner to release the brakes of the vehicle. This releases the pressure in the outlet port 28 and causes the inlet and outlet pressures of the blend back proportioning valve 14 to return to zero.

Figure 5:
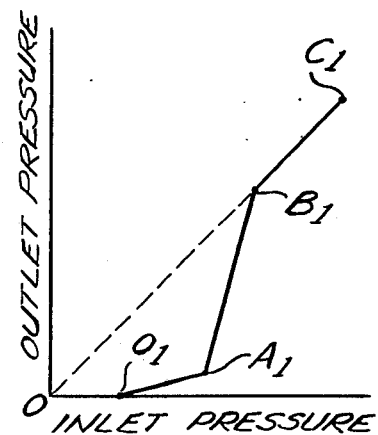
FIG. 5 is a graphical representation of the relationship between inlet and outlet pressures for the blend back proportioning valve shown in FIG. 4.

A second embodiment of the blend back proportioning valve is illustrated in FIGS. 4 and 5. The second embodiment may be substituted in the circuit shown in FIG. 1 for the first embodiment shown in FIG. 2. The structural elements of the second embodiment which are identical to those of the first embodiment are indicated by the same reference numbers used in FIG. 2 preceded by the number 1 and by the same reference letters used in FIG. 2 followed by the subscript 1. The second embodiment shown in FIG. 4 is structurally identical to the first embodiment shown in FIG. 2 with the exception that a holdoff spring 155 is added to the second embodiment shown in FIG. 4 to act between the outlet end cap 121 and the shuttle piston 136 to urge the center portion 150 of the inlet diaphragm 149 against the valve seat 131 when the brakes of the vehicle are deactuated. Additionally, a small recess 156 is added to the end cap 121 to position the spring 155.

The addition of the spring 155 in the second embodiment shown in FIG. 4 changes the proportioning characteristics of the valve so that the sensitivity of the brakes of the vehicle equipped with the second embodiment shown in FIG. 4 is further reduced from the sensitivity of the brakes of the vehicle provided with the first embodiment shown in FIG. 2.

When the air pressure in the inlet port 126 begins to increase, the pressure in the outlet port 128 does not begin to increase until the force of the inlet port pressure acting against the area $D_1$ of the center portion 150 exposed to such pressure is sufficient to overcome the preload of the hold-off spring 155. This portion of the operation of the second embodiment shown in FIG. 4 is illustrated by line $OO_1$ in FIG. 5.

After the pressures indicated at point $O_1$ in FIG. 5 have been reached, the shuttle piston 136 acts as a differential area pressure reducing piston to provide increases in outlet port pressure which are proportional to but less than increases in inlet port pressure just as was done by the first embodiment of the valve shown in FIG. 2. This portion of the operation of the valve is ilustrated by line $O_1A_1$ in FIG. 5. When the pressures indicated at point $A_1$ in FIG. 5 are reached, the preload of the blend back spring 143 is overcome and the shuttle piston 136 functions as a differential area pressure intensifying piston to provide increases in outlet port pressure which are proportional to but greater than increases in inlet port pressure. This portion of the operation of the valve is illustrated by line $A_1B_1$ in FIG. 5. Continued increases in inlet port pressure above point $B_1$ result in equal increases in outlet port pressure as the valve operates along line $B_1C_1$ in FIG. 5.

Figure 7:
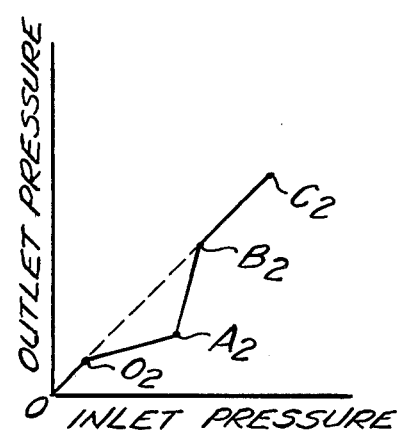
FIG. 7 is a graphical representation of the relationship between inlet and outlet pressures for the blend back proportioning valve shown in FIG. 6.
Figure 6:
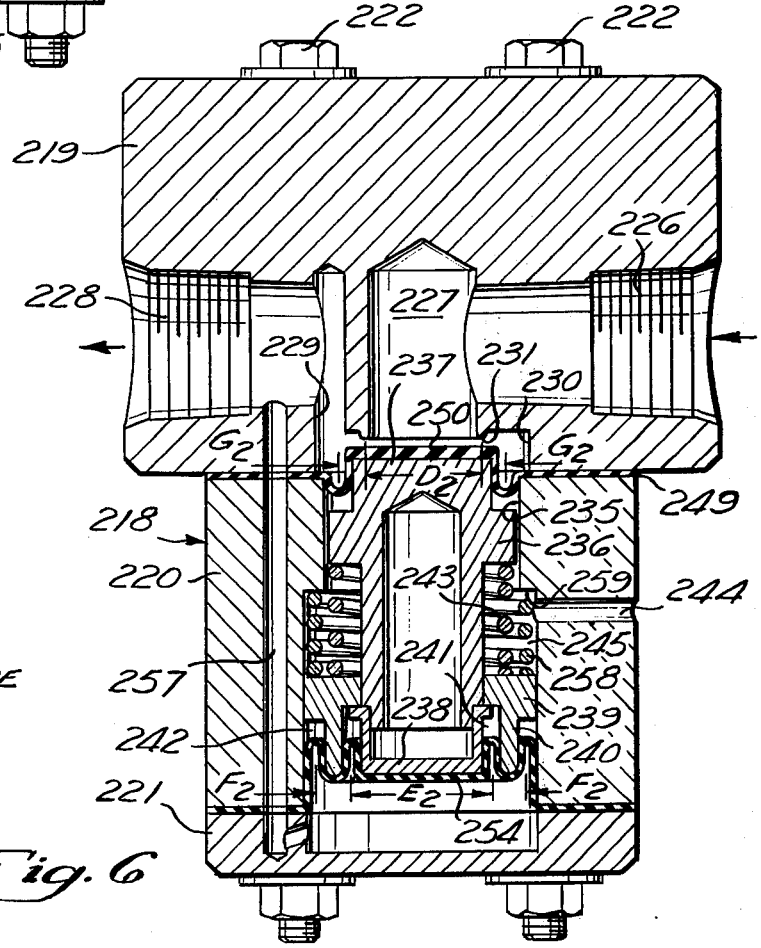
FIG. 6 is a lateral cross-sectional view of a third embodiment of a blend back proportioning valve which may be utilized in the system shown in FIG. 1.

A third embodiment of the blend back proportioning valve is illustrated in FIGS. 6 and 7. The third embodiment may be substituted in the circuit shown in FIG. 1 in place of the first embodiment shown in FIG. 2. The structural elements of the third embodiment which are identical to those of the first embodiment are indicated by the same reference numbers used in FIG. 2 preceded by the number 2 and by the same reference letters used in FIG. 2 followed by the subscript 2. The third embodiment shown in FIG. 6 is structurally identical to the first embodiment shown in FIG. 2 with two exceptions. The first exception is that a hold-open spring 258 is provided in the third embodiment acting between the main body 220 and the shuttle piston 236 through the sleeve 239. The second change is that the abutment surface in the bore 35 of the first embodiment shown in FIG. 2 is machined back to form an abutment surface 259 for the build-up spring 258.

These modifications in the third embodiment shown in FIG. 6 result in a circuit in which the brakes of the vehicle at low braking pressures are more sensitive than when the first embodiment is used in the circuit.

When the brakes of the vehicle are deactuated, the components of the third embodiment shown in FIG. 6 are held in the positions shown in FIG. 6 by the hold-open spring 258. In this position, the center portion 250 of the inlet diaphragm 249 is spaced from the valve seat 231 so that unrestricted fluid pressure communication is established between the inlet port 226 and the outlet port 228.

When the air pressure in the inlet port 226 begins to increase, identical increases in pressure in the outlet port 228 result due to the operation of the hold-open spring 258. This portion of the operation of the valve is illustrated by line $OO_2$ in FIG. 7 and permits a pressure build-up in the outlet port 228 before the proportioning begins.

When point $O_2$ is reached, the pressure acting on the area $E_2$ plus $F_2$ is enough greater than the pressure of the air acting on the smaller area $D_2$ plus $G_2$ to overcome the preload of the hold-open spring 258. This moves the center portion 250 against the valve seat 231 to restrict communication between the inlet port 226 and the outlet port 228.

Further increases in pressure from point $O_2$ result in the shuttle piston 236 acting as a differential diameter pressure reducing piston to maintain increases in outlet port pressure which are proportional to but less than increases in inlet port pressure. This portion of the operation of the valve is illustrated by line $O_2A_2$ in FIG. 7. When the pressures indicated at point $A_2$ are reached, the force of the outlet port pressure acting against the area $F_2$ is sufficient to overcome the preload of the blend back spring 243. Subsequent increases in pressure above point $A_2$ cause the shuttle piston 236 to act as a differential area pressure intensifying piston so that increases in inlet port pressure cause proportional but greater increases in outlet port pressure. This portion of the operation of the valve is illustrated by line $A_2B_2$ in FIG. 7. Further increases in pressure above point $B_2$ are met with equal increases in outlet port pressure along line $B_2C_2$.

What is claimed is:

1. In a motor vehicle air brake system having a source of high pressure air and a plurality of air brake actuators, a pressure proportioning valve; said pressure proportioning valve comprising a housing having an inlet port connected to said source of high pressure and an outlet port connected to said brake actuators, a bore between said inlet port and said outlet port, a shuttle piston slidably disposed in said bore, said shuttle piston having an inlet end and an outlet end and a valve surface, said valve surface being disposed on said inlet end, said valve surface being constructed and arranged to open and close pressure communication through said bore between said inlet port and said outlet port in response to a pressure unbalance on said inlet and outlet ends of said shuttle piston, said inlet and outlet ends each having a predetermined net lateral cross-sectional area exposed to the fluid pressure in said inlet and outlet ports respectively, said net inlet and outlet areas being different from one another by a predetermined ratio and being constructed and arranged to establish a predetermined ratio between changes in one of said port pressures and changes in the other of said port pressures, one of said ends including a shuttle piston portion and an annular sleeve and a diaphragm all disposed in said bore, said shuttle piston portion being connected to the other of said ends, said sleeve being disposed radially outwardly of said shuttle piston portion in said bore and being slidable in said bore relative to said shuttle piston portion, said sleeve including an axially extending skirt portion, said skirt portion being spaced radially inwardly away from said bore and radially outwardly away from said shuttle piston portion, said skirt portion and said bore cooperatively defining an annular outer diaphragm cavity, said skirt portion and said shuttle piston portion cooperatively defining an annular inner diaphragm cavity, said diaphragm having a radially outer peripheral portion secured to said housing and a radially inner center portion secured to said shuttle piston portion, and said diaphragm extending axially from its radially outer peripheral portion into said outer diaphragm cavity and extending axially from its radially inner center portion into said inner diaphragm cavity.

2. A pressure proportioning valve as defined in claim 1 wherein said diaphragm is a one piece elastomeric diaphragm and extends laterally across the entire lateral extent of said bore.

3. A pressure proportioning valve as defined in claim 1 wherein the portion of said diaphragm which extends into said outer diaphragm cavity and the portion of said diaphragm which extends into said inner diaphragm cavity are each U-shaped and are constructed and arranged to roll in their associated cavities during movement of said sleeve relative to said bore and relative to said shuttle piston portion.

4. A pressure proportioning valve as defined in claim 1 wherein said one of said ends is said outlet end and said other of said ends is said inlet end.

5. A pressure proportioning valve as defined in claim 4 wherein said inlet end includes another shuttle piston portion and another diaphragm, said inlet shuttle piston portion being rigidly secured to said outlet shuttle piston portion for movement therewith under all conditions, and said inlet diaphragm includes a radially outer peripheral portion secured to said housing and a radially inner center portion secured to said inlet shuttle piston portion.

6. A pressure proportioning valve as defined in claim 5 wherein said outlet diaphragm and said inlet diaphragm cooperatively define a reference pressure chamber therebetween.

7. A pressure proportioning valve as defined in claim 6 wherein said inlet diaphragm is a one-piece elastomeric diaphragm, and said radially inner center portion of said inlet diaphragm is said valve surface.

8. A pressure proportioning valve as defined in claim 7 wherein said housing includes an annular valve seat surrounding said bore adjacent said valve surface, and said valve surface is constructed and arranged to move toward and away from said valve seat to open and close said pressure communication through said bore between said inlet port and said outlet port in response to said pressure unbalance on said inlet and outlet ends of said shuttle piston.

9. A pressure proportioning valve as defined in claim 8 wherein said center portion and said radially outer portion of said inlet diaphragm each have a predetermined wall thickness, and said wall thickness of said radially inner center portion of said inlet diaphragm is substantially greater than the wall thickness of said radially outer peripheral portion of said inlet diaphragm.

10. In a motor vehicle air brake system having a source of high pressure air and a plurality of air brake actuators, a pressure proportioning valve; said pressure proportioning valve comprising a housing having an inlet port connected to said source of high pressure and an outlet port connected to said brake actuators, a bore between said inlet port and said outlet port, a shuttle piston slidably disposed in said bore, said shuttle piston having an inlet diaphragm at one of its ends and an outlet diaphragm at the other of its ends, said inlet diaphragm including one side having a predetermined net area exposed to inlet port pressure under all conditions, said outlet diaphragm including one side having first and second predetermined net areas exposed to outlet port pressure under all conditions, said outlet diaphragm having a radially outer peripheral portion secured to said housing and a concentric radially inner center portion providing said first outlet area and a concentric annular intermediate portion providing said second outlet area, said inlet and outlet diaphragms being axially spaced apart and cooperatively defining in said housing a reference pressure chamber, said reference pressure chamber being constructed and arranged such that it is isolated from pressure in said inlet port and from pressure in said outlet port under all conditions, said inlet area and said first and second outlet areas each having another side exposed to the pressure in said reference pressure chamber, said inlet area having a valve surface movable between an open position and a closed position for throttling flow from said inlet port to said outlet port to control increases in pressure in said outlet port in response to increases in pressure in said inlet port, said inlet area being constructed and arranged such that the pressure in said inlet port acting against said inlet area urges said valve member toward said open position, said first and second outlet areas each being constructed and arranged such that the pressure in said outlet port acting against said first and second outlet area urges said valve member toward said closed position when said outlet port pressure is less than a predetermined pressure, said second outlet area being constructed and arranged to be axially movable relative to said inlet area and relative to said first outlet area from a rest position to a displaced position, said second outlet area being in said rest position when said outlet port pressure is less than said predetermined pressure, said second outlet area being in said displaced position when said outlet pressure exceeds said predetermined pressure, said second outlet area being constructed and arranged such that the pressure in said outlet port acting against said second outlet area is inoperative to urge said valve surface toward said closed position but urges said second outlet area against said housing when said second outlet area is in said displaced position.

11. A pressure proportioning valve as defined in claim 10 wherein said shuttle piston includes a shuttle piston inlet portion and a shuttle piston outlet portion, said shuttle piston inlet and outlet portions being rigidly secured to one another for axial movement in said bore, an annular sleeve disposed in said bore between said shuttle piston outlet portion and said bore, a spring acting between said sleeve and said shuttle piston inlet portion, said annular sleeve being slidable in said bore relative to said shuttle piston outlet portion from a rest position to a displaced position when said outlet port pressure is less than said predetermined pressure, said annular sleeve being spaced radially inwardly from said bore and cooperatively defining therewith an annular outer diaphragm cavity, said annular sleeve being spaced radially outwardly from said shuttle piston outlet portion and cooperatively defining therewith an annular inner diaphragm cavity, said intermediate portion of said outlet diaphragm extending axially from said radially outer peripheral portion into said outer diaphragm cavity, said intermediate portion of said outlet diaphragm extending axially from said radially inner center portion into said inner diaphragm cavity, said radially inner center portion of said outlet diaphragm acting against said shuttle piston outlet portion under all conditions, and said annular intermediate portion of said outlet diaphragm acting against said annular sleeve under all conditions.

12. A pressure proportioning valve as defined in claim 11 including another spring acting between said shuttle piston and said housing in a direction to bias said shuttle piston in a direction to move said valve surface to said open position.

13. A pressure proportioning valve as defined in claim 11 including another spring acting between said shuttle piston and said housing in a direction to move said valve surface to said closed position.

14. In a motor vehicle air brake system having a source of high pressure air and a plurality of air brake actuators, a pressure porportioning valve; said pressure proportioning valve comprising a housing having an inlet port connected to said source of high pressure and an outlet port connected to said brake actuators, a bore between said inlet port and said outlet port, a shuttle piston slidably disposed in said bore, said shuttle piston having an inlet end and an outlet end and a valve surface, said valve surface being disposed on said inlet end, said valve surface being constructed and arranged to open and close pressure communication through said bore between said inlet port and said outlet port in response to a pressure unbalance on said inlet and outlet ends of said shuttle piston, said inlet and outlet ends having a predetermined net lateral cross-sectional area exposed to the fluid pressure in said inlet and outlet ports respectively, said net inlet and outlet areas being different from one another by a predetermined ratio and being constructed and arranged to establish a predetermined ratio between changes in said inlet port pressure and changes in said outlet port pressure, said inlet end of said shuttle piston including a shuttle piston inlet portion and a one-piece elastomeric inlet diaphragm, said inlet diaphragm extending laterally across the entire lateral extent of said bore, said inlet diaphragm having a radially outer portion secured to said housing and a radially inner portion secured to said shuttle piston inlet portion and an annular intermediate portion, said annular intermediate portion being U-shaped and being disposed between said shuttle piston inlet portion and said bore, said radially inner portion being said valve surface, said housing including an annular valve seat surrounding said bore adjacent said valve surface, said valve surface being constructed and arranged to move toward and away from said valve seat to open and close said pressure communication through said bore between said inlet port and said outlet port in response to said pressure unbalance on said inlet and outlet ends of said shuttle piston, said radially inner portion and said radially outer portion and said annular intermediate portion of said inlet diaphragm each having a predetermined wall thickness, and said wall thickness of said radially inner portion of said inlet diaphragm being substantially greater than the wall thickness of said outer peripheral portion and annular intermediate portion of said inlet diaphragm.

* * * * *